US009592559B2

(12) United States Patent
Cabanac et al.

(10) Patent No.: US 9,592,559 B2
(45) Date of Patent: Mar. 14, 2017

(54) MANUAL DRILLING APPARATUS EQUIPPED WITH A DEVICE FOR CONTROL OF ADVANCE

(71) Applicant: Airbus Operations (S.A.S.), Toulouse (FR)

(72) Inventors: Nicolas Cabanac, Saint Sauveur (FR); Jean-Pascal Cabot, Toulouse (FR); Alexandre Lestruhaut, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 140 days.

(21) Appl. No.: 14/595,702

(22) Filed: Jan. 13, 2015

(65) Prior Publication Data

US 2015/0196986 A1  Jul. 16, 2015

(30) Foreign Application Priority Data

Jan. 16, 2014  (FR) ..................... 14 50338

(51) Int. Cl.
*B23Q 5/32* (2006.01)
*B23B 49/02* (2006.01)
*B23B 45/00* (2006.01)
*B25H 1/00* (2006.01)
*B23B 49/00* (2006.01)
(Continued)

(52) U.S. Cl.
CPC .............. *B23B 49/02* (2013.01); *B23B 45/00* (2013.01); *B23B 49/008* (2013.01); *B23Q 5/326* (2013.01); *B23Q 17/00* (2013.01); *B25F 5/003* (2013.01); *B25H 1/0078* (2013.01); *B23B 2215/04* (2013.01); *B23B 2260/07* (2013.01); *B23B 2260/128* (2013.01); *B23B 2260/138* (2013.01); *B25H 1/0035* (2013.01); *Y10T 408/17* (2015.01);
(Continued)

(58) Field of Classification Search
CPC .............. Y10T 408/17; Y10T 408/564; Y10T 408/5647; Y10T 408/675; B23Q 5/32; B23Q 5/326; B23Q 5/323; B23Q 15/013; B25H 1/0021; B25H 1/0035; B25H 1/0078

See application file for complete search history.

(56) References Cited

U.S. PATENT DOCUMENTS 2,050,709 A   8/1936  Lopez
2,358,954 A * 9/1944  Verderber ................ B23Q 5/32
                                                    74/441
(Continued)

FOREIGN PATENT DOCUMENTS

DE       32 21 709       12/1983

OTHER PUBLICATIONS

French Search Report for Application No. 1450338 dated Sep. 26, 2014.

*Primary Examiner* — Daniel Howell
(74) *Attorney, Agent, or Firm* — Jenkins, Wilson, Taylor & Hunt, P.A.

(57) ABSTRACT

A manual drilling apparatus equipped with a device for control of advance, which includes a fixed part and a mobile part with movement of translation relative to the fixed part during the drilling, as well as a system for control of the movement of translation of the mobile part relative to the fixed part, wherein the fixed part and the mobile part comprise respectively at least one fixed tube and at least one mobile tube which slide relative to one another, the fixed and mobile tubes being coaxial to the axis of rotation of the tool supported by the apparatus.

13 Claims, 2 Drawing Sheets

(51) Int. Cl.
*B25F 5/00* (2006.01)
*B23Q 17/00* (2006.01)

(52) U.S. Cl.
CPC .......... *Y10T 408/172* (2015.01); *Y10T 408/21* (2015.01); *Y10T 408/5647* (2015.01)

(56) References Cited

U.S. PATENT DOCUMENTS

| | | | | |
|---|---|---|---|---|
| 2,784,616 | A | * | 3/1957 | Quackenbush ....... B23B 49/008 408/112 |
| 2,893,276 | A | * | 7/1959 | Quackenbush .......... B23Q 5/32 74/405 |
| 2,913,934 | A | * | 11/1959 | Quackenbush .......... B23Q 5/32 74/841 |
| 3,897,166 | A | * | 7/1975 | Adams ................... A61B 17/16 408/132 |
| 4,027,992 | A | * | 6/1977 | Mackey, Sr. .......... B23B 49/026 269/87.3 |
| 6,247,879 | B1 | * | 6/2001 | Costa ................... B25H 1/0078 408/110 |
| 7,112,015 | B2 | * | 9/2006 | Roberts ................ B23B 45/003 408/112 |
| 2008/0166193 | A1 | | 7/2008 | Fuchs et al. |

* cited by examiner

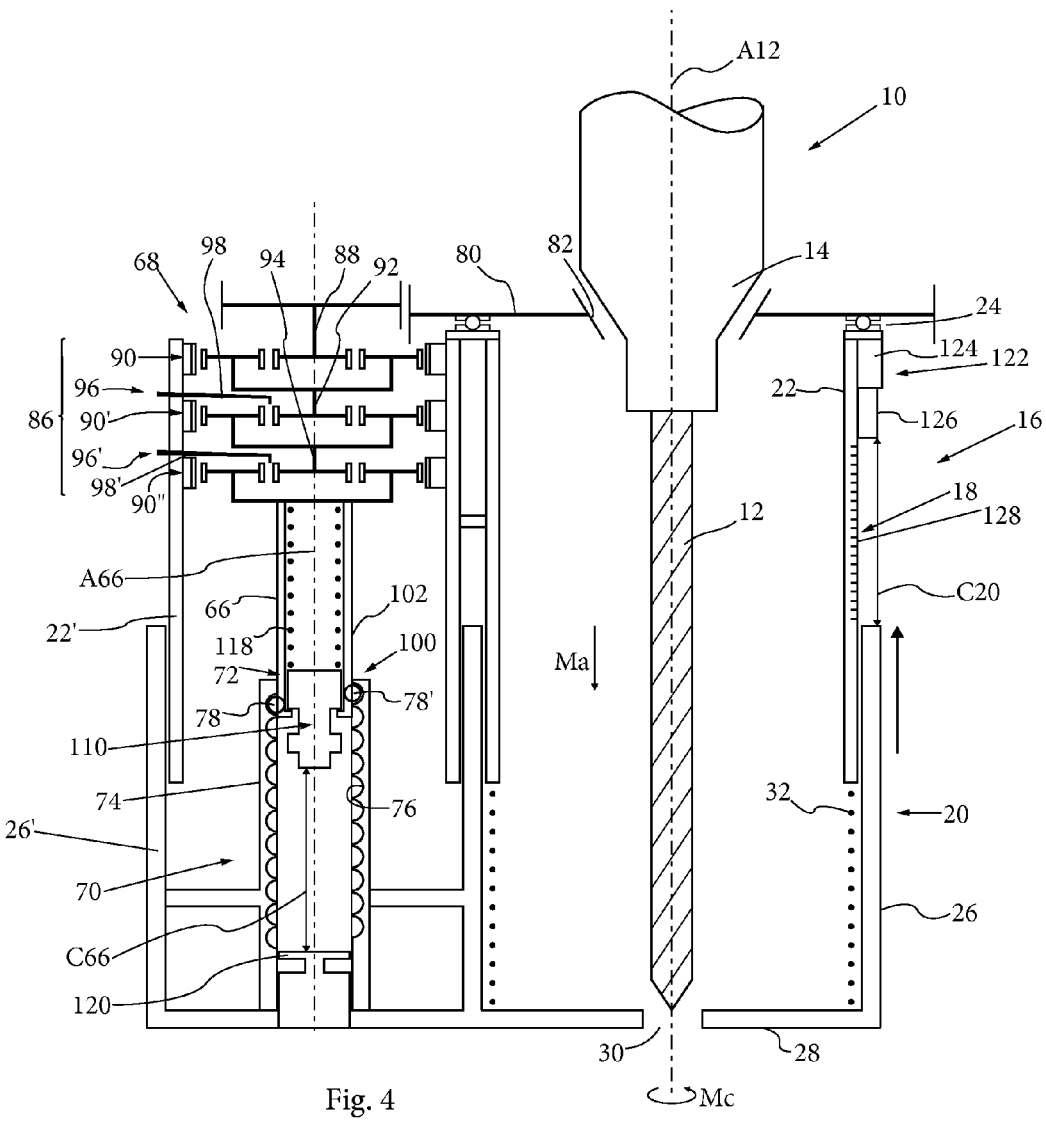
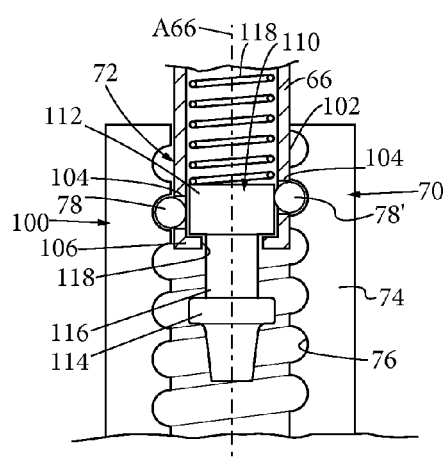
Fig. 5A
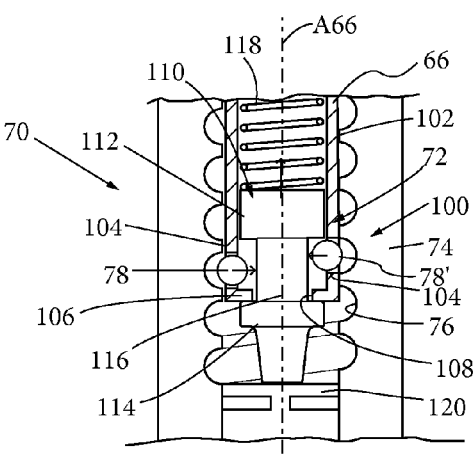
Fig. 5B

MANUAL DRILLING APPARATUS EQUIPPED WITH A DEVICE FOR CONTROL OF ADVANCE

CROSS-REFERENCE TO RELATED APPLICATION

This application claims priority to FR 14 50338 filed Jan. 16, 2014, the entire disclosure of which is incorporated by reference herein.

TECHNICAL FIELD

The subject matter disclosed herein relates to a manual drilling apparatus equipped with a device for control of advance.

BACKGROUND

The operation of drilling by machining includes producing a hole using a tool such as a drill bit with an axis of rotation, the tool being driven by cutting movement which corresponds to rotation of the tool around itself according to its axis of rotation, combined with movement of advance which corresponds to movement of translation of the tool according to its axis of rotation.

The drilling operation can be carried out using a machine tool or an articulated arm of a robot. In these cases, the movements of cutting and advance are imposed by actuators such as motors for example, and are perfectly controlled.

In the aeronautical field, the operation of drilling into a part can be carried out by a portable drill.

In a known manner, a portable drill comprises a body which is intended to be held by a user, with a head equipped with a chuck in which a tool is inserted. The body comprises a motor to which the chuck is connected, and which imposes cutting movement on the chuck.

In the case of a portable drill, only the cutting movement is imposed by the drill. The movement of advance is imposed by the user who is holding the drill, and applies a force on the drill in the direction of the part to be drilled.

However, for certain applications such as drilling into composite materials, it is essential to control the movement of advance in order to avoid phenomena of delamination or scaling if the movement of advance is too rapid, or burning phenomena if the movement of advance is too slow.

Control of the movement of advance by the user requires great dexterity. This control is all the more difficult as the user is exerting a significant force.

In order to better control the movement of advance, a device for control of advance is known which is secured on the portable drill.

It comprises a jack with a body which is rendered integral with the manual drilling apparatus, and a piston which slides in the body and supports a rod, an end of which is situated on the exterior of the body.

The piston delimits together with the body two chambers, each of them being filled with a fluid and communicating with the exterior via a fluid network. The device for control of advance also comprises a control the filling and/or emptying of the chambers in order to control the movement of translation of the rod, which is mobile between an extended position and a retracted position.

According to this device of the prior art, before the drilling, the rod is in the extended position, and its end is supported against the part to be drilled. During the drilling, the force exerted by the user on the drill in the direction of the part causes by reaction a force of the part on the rod of the jack, which is then translated into the retracted position. This movement of translation gives rise to filling of a first chamber and emptying of a second chamber. According to the prior art, it is then possible to control the advance of the tool by braking the movement of the rod, by controlling the filling and/or the emptying of at least one of the chambers.

This device for control of advance is not fully satisfactory because of its dimensions. Thus, the part to be drilled must have a large flat surface area around the hole to be produced, in order for the rod to be able to be supported against the part to be drilled, and this is not always the case. In addition, the presence of a rod which is mobile according to a direction parallel to, and spaced from, the axis of the drill bit results in large dimensions around the drill bit, which can be problematic when drilling a hole in an area which is not very accessible.

SUMMARY

Thus, an object of the present disclose is to eliminate the disadvantages of the prior art.

For this purpose, a subject of the subject matter disclosed herein is a manual drilling apparatus equipped with a device for control of advance of the tool, which comprises a fixed part and a mobile part with movement of translation relative to the fixed part during the drilling, as well as a system for control of the movement of translation of the mobile part relative to the fixed part.

According to the subject matter disclosed herein, the drilling apparatus is characterized in that:
  the fixed part and the mobile part comprise respectively at least one fixed tube and at least one mobile tube which slide relative to one another, the fixed and mobile tubes being coaxial to the axis of rotation of the tool; and
  the system for control of the movement of translation of the mobile part relative to the fixed part comprises:
    a rotary element;
    a converter of the movement of translation of the mobile part relative to the fixed part into movement of rotation of the rotary element;
    a control for controlling the movement of rotation of the rotary element.

This configuration makes it possible to reduce the hold of the drilling apparatus on the part to be drilled, and to be able to use the device for control of advance even if the part to be drilled has a small flat surface area around the hole. According to another advantage provided by this configuration, the forces between the part to be drilled, the fixed and mobile parts and the manual drilling apparatus are aligned according to the direction of the axis of rotation of the tool.

According to a first variant, the converter of the movement of translation of the mobile part relative to the fixed part into movement of rotation of the rotary element comprises a rack, which is connected to the fixed part and is parallel to the axis of rotation, and a toothed wheel or a pinion which engages with the rack, and is integral with a shaft which pivots in a bearing connected to the mobile part.

Preferably, the control for controlling the movement of rotation of the rotary element comprises:
  a detector or measurement device for measuring the speed of rotation of the rotary element;
  a brake the rotary element upon receipt of a control signal;
  an automatic control for comparison of the speed of rotation measured with at least one set value, and for emitting a control signal if the speed of rotation measured is greater than the set value.

According to a second variant, the control for controlling the movement of rotation of the rotary element comprises a mechanism for coupling the rotary element with the chuck.

According to one embodiment, the coupling mechanism comprises a toothed wheel with a friction cone in the centre which is in contact with the chuck.

Preferably, the coupling mechanism comprises a reducer. In this case, the reducer advantageously comprises structure for adjusting the ratio between the input and output speeds of rotation of the reducer.

According to another characteristic, the converter of the movement of translation of the mobile part relative to the fixed part into movement of rotation of the rotary element comprises a helical connection comprising a tube with an axis which is parallel to the axis of rotation and is integral with the mobile part, with a wall which has at least one helical groove, the rotary element comprising at least one projecting element, the forms of which co-operate with those of the helical groove. Preferably, the helical connection comprises a disengagement mechanism.

According to another characteristic of the subject matter disclosed herein, the device for control of advance comprises at least one stop to limit the course of the mobile part relative to the fixed part.

According to another characteristic of the subject matter disclosed herein, the device for control of advance comprises an indicator for indicating the relative position of the mobile part in relation to the fixed part.

BRIEF DESCRIPTION OF THE DRAWINGS

Other characteristics and advantages will become apparent from the following description of the subject matter disclosed herein, provided purely by way of example, in relation to the appended drawings in which:

FIG. 4 is a diagram of a device for control of advance which illustrates a second variant of the subject matter disclosed herein;

FIG. 5A is a view in longitudinal cross section of part of a device for control of advance according to the second variant, in the engaged state;

FIG. 5B is a view in longitudinal cross section of part of a device for control of advance according to the second variant, in the disengaged state.

DETAILED DESCRIPTION

Figure 1:
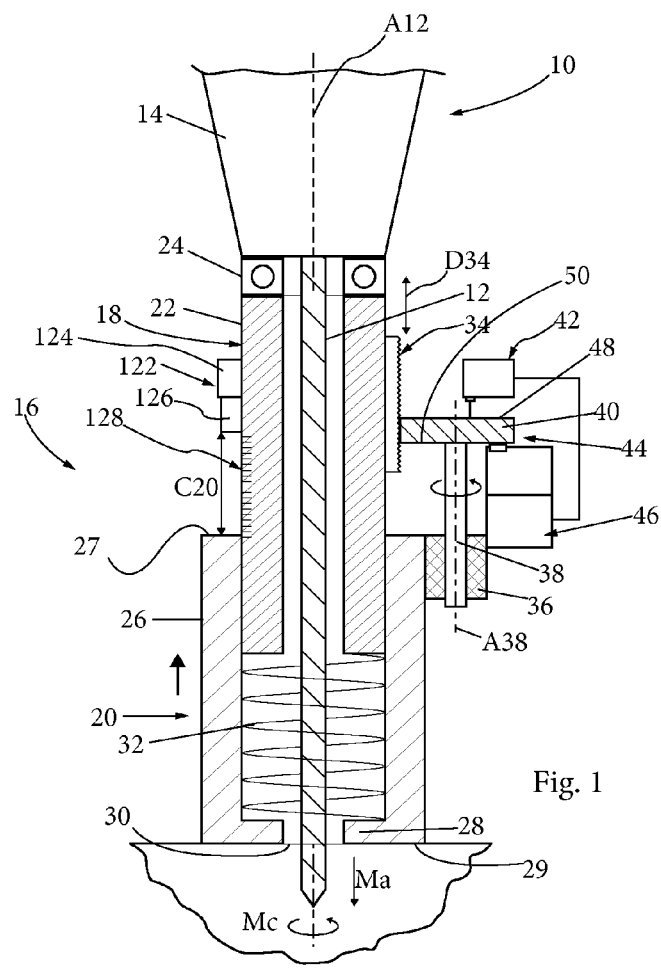
FIG. 1 is a diagram of a device for control of advance which illustrates a first variant of the subject matter disclosed herein.

In FIGS. 1 and 4, 10 represents part of a manual drilling apparatus supporting a tool 12. This tool 12 comprises an axis of rotation A12. According to one embodiment, the tool 12 is a drill bit.

Drilling means machining consisting of producing a blind or through hole in at least one part.

In order to machine a bore in a part, the tool 12 is driven by cutting movement Mc which corresponds to movement of rotation of the tool 12 around itself, according to the axis of rotation A12, combined with movement of advance Ma which corresponds to translation of the tool 12 according to an axis parallel to the axis of rotation A12.

The cutting movement is characterized substantially by a cutting speed, in particular by a number of revolutions per minute of the tool 12 according to the axis of rotation A12.

The movement of advance is characterized by a speed of advance, in particular by a number of millimeters per minute of the tool 12, performing translation according to the axis of rotation A12.

Manual drilling apparatus means an apparatus which imposes on the tool 12 a cutting movement Mc, the movement of advance Ma being imposed by the action of a user.

According to one embodiment, the manual drilling apparatus 10 is a portable drill. It comprises a chuck 14 which makes it possible to secure the tool 12 in a removable manner. The chuck 14 is rotated according to the axis of rotation A12 during the drilling, by a motor which is integrated in the manual drilling apparatus.

The manual drilling apparatus 10 is not described in further detail since in itself it is known to persons skilled in the art.

FIGS. 1 and 4 also represent a device for control of advance 16 in the form of a joining piece connected by a connection, which is preferably removable, to the manual drilling apparatus.

This device for control of advance 16 comprises two parts, i.e. a fixed part 18 and a mobile part 20 with movement of translation relative to the fixed part 18, parallel to the movement of advance Ma and dependent on this movement of advance Ma.

According to one embodiment, when the device for control of advance is secured on the manual drilling apparatus, the fixed part 18 comprises a fixed tube 22 coaxial to the axis of rotation A12, with a first end in contact with the manual drilling apparatus 10, and a second through end. Advantageously, a thrust ball bearing 24 is interposed between the fixed tube 22 and the chuck 14, such as to permit movement of rotation according to the axis of rotation A12 between the fixed tube 22 and the chuck 14. According to this arrangement, the fixed tube 22 is immobile in translation according to a direction parallel to the axis of rotation A12 relative to the chuck 14.

According to one embodiment, the mobile part 20 comprises a mobile tube 26 which is connected to the fixed tube 22 by a slide connection which permits movement of translation between the two tubes 22 and 26 according to a direction parallel to the axis of rotation A12, while maintaining an overlapping area between the fixed tube 22 and the mobile tube 26. According to one arrangement, the mobile tube 26 slides on the exterior of the fixed tube 22.

The mobile tube 26 comprises a first end 27 which is translated along the fixed tube 22, and a second end 29 comprising an end wall 28 with an orifice 30, in order to permit the passage of the tool 12. In this case, the second end, and more specifically the end wall 28, is supported against the part to be drilled during the drilling.

As a variant, the second end 29 of the mobile tube 26 does not comprise an end wall. According to this variant, the second end 29 is supported against the part to be drilled during the drilling.

The mobile part 20 has a course which is delimited by a deployed position, corresponding to maximum spacing between the second end 29 of the mobile tube 26 and the fixed tube 22, and a retracted position, corresponding to minimum spacing between the second end 29 of the mobile tube 26 and the fixed tube 22.

In the deployed position, the tool 12 does not pass through the orifice 30, and remains in the interior of the tubes 22 and 26. In the retracted position, the tool 12 passes through the orifice 30, and thus penetrates into the part to be drilled.

The device for control of advance 16 comprises a return 32 which retains the mobile part 20 in the deployed position.

During the drilling, the user exerts a force on the drilling apparatus. This force comprises a component which is parallel to the direction of the axis of rotation A12 and is oriented towards the part to be drilled. The end of the mobile part 20 is in contact with the part to be drilled, and, by reaction to the force exerted by the user, the mobile part 20 is translated towards the retracted position, against the return 32. Consequently, the movement of advance of the tool and its speed of advance are identical respectively to the movement of translation of the mobile part 20 relative to the fixed part 18, and to the speed of the movement of translation.

The device for control of advance 16 comprises a system for control of the movement of translation of the mobile part 20 relative to the fixed part 18, and consequently of the movement of advance of the tool.

Figure 2:
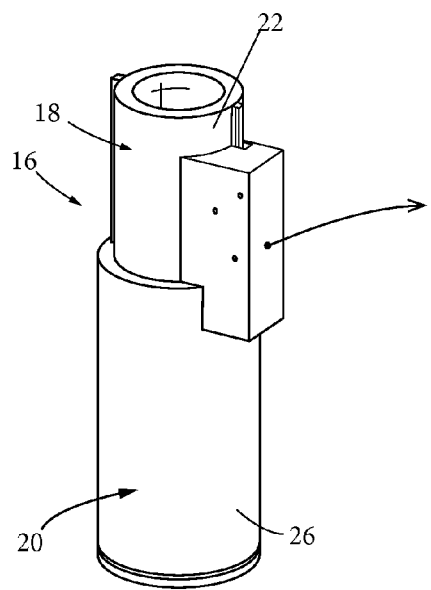
FIG. 2 is a view in perspective of a device for control of advance which illustrates an embodiment according to the first variant of the subject matter disclosed herein.
Figure 3:
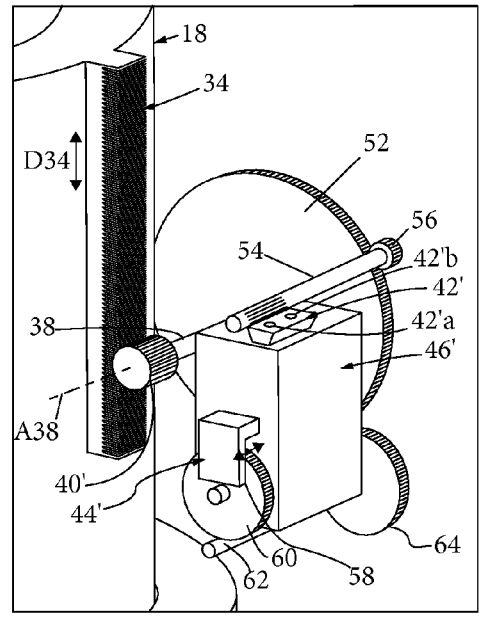
FIG. 3 is a view in perspective of part of the device illustrated in FIG. 2.

According to a first variant illustrated in FIGS. 1 to 3, the fixed part 18 comprises, along an outer generatrix, a rack 34 which is oriented according to a direction D34 parallel to the axis of rotation A12. As a complement, the mobile part 20 comprises a shaft 38 which is configured such as to pivot in a bearing 36. This shaft 38 comprises at a first end a toothed wheel or a pinion 40, 40' which engages with the rack 34.

The assembly formed by the rack 34 and the toothed wheel or the pinion 40, 40' makes it possible to convert movement of translation into movement of rotation.

According to a first embodiment illustrated in FIG. 1, the shaft 38 has an axis A38 parallel to the axis of rotation A12. According to this configuration, the axis A38 is thus parallel to the direction D34 of the rack. In this first embodiment, the toothed wheel 40 and the rack 34 have oblique toothing.

According to this first embodiment, the system for control of the movement of relative translation between the fixed 18 and mobile 20 parts comprises:
 a detector or measurement device for measuring the speed of rotation of the toothed wheel 40, such as, for example, an incremental sensor 42;
 a brake 44 for braking which can brake the toothed wheel upon receipt of a control signal;
 an automatic control 46 for comparison of the speed of rotation, measured with at least one set value, and for emitting a control signal if the speed of rotation measured is greater than the set value.

The toothed wheel 40 comprises two surfaces, i.e. an upper surface 48 and a lower surface 50. According to one arrangement, the incremental sensor 42 comprises at least one light signal emitter and at least one receiver opposite the upper surface 48, which comprises radial marks.

According to one embodiment, the brake 44 comprises a runner which is mobile between a position of rest, in which the runner is spaced from the lower surface 50, and an active position in which the runner is in contact with the lower surface 50, and brakes the rotation of the toothed wheel 40. Upon receipt of a control signal, the runner is displaced from the position of rest to the active position.

According to a second embodiment illustrated in FIGS. 2 and 3, the shaft 38 has an axis A38 perpendicular to the axis of rotation A12. According to this configuration, the axis A38 is perpendicular to the direction D34 of the rack. In this case, the pinion 40' and the rack 34 advantageously have straight tooth ing.

At a second end, the shaft 38 comprises a toothed wheel 52.

According to this second embodiment, the system for control of the movement of relative translation between the fixed 18 and mobile 20 parts comprises:
 a detector or measurement device for measuring the speed of rotation of the toothed wheel 52, such as, for example, an incremental sensor 42';
 a brake 44' for braking configured to brake the rotation of the toothed wheel 52 upon receipt of a control signal;
 an automatic control 46', for comparison of the speed of rotation measured with at least one set value, and for emitting a control signal if the speed of rotation measured is greater than the set value.

According to this second embodiment, the incremental sensor 42' comprises a first return shaft 54 which has at a first end a pinion 56 which engages with the toothed wheel 52. The first return shaft 54 has an axis of rotation parallel to the axis A38, and comprises a plurality of marks which are disposed according to a plurality of generatrices of the first return shaft 54, and are distributed on its periphery.

In addition to the first return shaft 54, the incremental sensor 42' comprises at least one emitter 42'a and at least one receiver 42'b opposite marks of the first return shaft 54.

The brake 44' comprises a clamp 58 and a disc 60 which is synchronized with the toothed wheel 52 by a second return shaft 62 with an axis of rotation parallel to the axis A38. The clamp 58 is mobile between an active position, in which the clamp 58 clamps the disc 60, and a position of rest in which the clamp does not clamp the disc 60. Upon receipt of a control signal, the clamp 58 is displaced from the position of rest to the active position.

According to one embodiment, this second return shaft 62 comprises a portion which engages with the disc 60, and has at a first end a pinion or a toothed wheel 64 which engages with the toothed wheel 52.

According to the two embodiments of this variant, the automatic control 46, 46' comprises a microprocessor, which integrates the functions of the structure or device for comparison and of the emitter for emitting a control signal. Preferably, the automatic control 46, 46' is integrated in the incremental sensor 42, 42'.

Advantageously, the set value can be modified and programmed.

It will be appreciated that the subject matter disclosed herein is not limited to the brake or to the device or structure for measurement previously described.

The operating principle of the first variant is as follows.

Before the drilling, the user programs the set value.

During the drilling, the mobile part 20 is translated according to a direction parallel to the axis of rotation A12, from the deployed position to the retracted position, and generates movement of translation of the rack 34, with a speed which is identical to the speed of advance of the tool 12. This movement of translation of the rack 34 gives rise to rotation of the toothed wheel 40 or 52 at a speed of rotation which depends on the speed of advance of the tool 12.

The incremental sensor 42 or 42' measures the speed of rotation of the toothed wheel 40 or 52, and transmits to the automatic control 46 or 46' a signal which depends on the speed of rotation measured of the toothed wheel 40 or 52, and is therefore representative of the speed of advance of the tool 12.

If the speed of rotation measured is greater than the set value programmed, the automatic control 46 or 46' transmits a control signal to the brake 44 or 44', which brakes the rotation of the toothed wheel 40 or 52, and thus brakes the movement of translation of the mobile part 20 relative to the fixed part 18.

As soon as the speed of rotation measured is lower than the set value programmed, the automatic control 46 or 46' does not transmit a control signal to the brake 44 or 44', which does not brake the rotation of the toothed wheel 40 or 52.

According to this first variant, the control system makes it possible to regulate the speed of advance of the tool 12 by braking the movement of translation of the mobile part 20 relative to the fixed part 18, if the speed of rotation of the toothed wheel 40 or 52 is greater than a set value.

Advantageously, the system for control of the movement of translation of the mobile part 20 relative to the fixed part 18 makes it possible to regulate the speed of advance of the tool 12 depending on the position of the tool 12 according to the direction of the axis of rotation A12. Thus, during the drilling, the tool 12 can have a first speed of advance over a certain range of its movement, according to the direction of the axis of rotation A12, and a second speed of advance over another range. In this case, the control system is configured for determining the relative position of the mobile part 20 in relation to the fixed part 18, according to the direction of the axis of rotation A12. For example, the incremental sensor 42, 42' makes it possible to determine the position of the mobile part 20 relative to the fixed part 18.

As a complement, the automatic control 46, 46' comprises a plurality of set values according to the position of the mobile part 20 relative to the fixed part 18, and compares the speed of rotation of the toothed wheel 40 or 52 with the appropriate set value.

According to a second variant illustrated in FIGS. 4, 5A and 5B, the system for control of the movement of relative translation between the fixed 18 and mobile 20 parts comprises:
- a drive shaft 66, which is configured to pivot on itself according to an axis of rotation A66 at a speed of rotation which depends on the cutting speed of the tool 12;
- a mechanism 68 for coupling the drive shaft 66 with the chuck 14;
- a helical connection 70 between a first end 72 of the drive shaft 66 and the mobile part 20.

According to one embodiment, the helical connection 70 comprises a tube 74 with an axis which is parallel to the axis of rotation A12 and integral with the mobile part 20, with an inner wall which has at least one helical groove 76.

The first end 72 of the drive shaft 66 comprises at least one projecting element 78, 78', the forms of which co-operate with those of the helical groove 76.

The helical connection 70 makes it possible to convert movement of rotation with a speed of rotation of the drive shaft 66, into movement of translation of the mobile part 20, with a linear speed which depends on the speed of rotation, and on the pitch of the helical groove 76.

The coupling mechanism 68 comprises a toothed wheel 80 comprising in the centre a friction cone 82 which is in contact with the chuck 14. This friction cone 82 ensures the transmission of the movement of rotation of the chuck 14 to the toothed wheel 80, and the speed of rotation of the toothed wheel 80 is thus identical to the speed of rotation of the chuck 14.

The coupling mechanism 68 also comprises a reducer 86, which is interposed between the toothed wheel 80 and the drive shaft 66. This reducer 86 makes it possible to reduce the speed of rotation between the toothed wheel 80 and the drive shaft 66. The reducer 86 comprises at least one ratio R between an input speed of rotation of the reducer 86, and an output speed of rotation of the reducer 86. Thus, the speed of rotation of the drive shaft 66 is equal to the speed of rotation of the toothed wheel 80 divided by the ratio R.

According to one embodiment, the reducer 86 comprises an input shaft 88 which engages with the toothed wheel 80, and an output shaft which corresponds to the drive shaft 66, as well as at least one planetary gear train 90 which is interposed between the input and output shafts.

According to one embodiment illustrated in FIG. 4, the reducer 86 comprises three planetary gear trains 90, 90', 90'' in series.

Advantageously, the reducer 86 is configured for adjusting the ratio R between the speed of rotation of the input shaft 88 of the reducer 86, and the speed of rotation of the output shaft 66 of the reducer 86. Preferably, the reducer 86 comprises a plurality of ratios and is configured for selection of a ratio from amongst the ratios available.

For this purpose, the reducer 86 comprises a plurality of planetary gear trains 90, 90', 90'', i.e. a first planetary gear train 90 with a ratio R, a second planetary gear train 90' with a ratio R', and a third planetary gear train 90'' with a ratio R''. The first planetary gear train 90 comprises an input shaft which corresponds to the input shaft 88 of the reducer, and an output shaft 92 which corresponds to the input shaft of the second planetary gear train 90'.

The third planetary gear train 90'' comprises an input shaft 94 which corresponds to the output shaft of the second planetary gear train 90', and an output shaft which corresponds to the output shaft of the reducer, i.e. the drive shaft 66.

In addition to the planetary gear trains 90, 90', 90'', the reducer 86 comprises at least one disengagement system 96, 96'. According to one embodiment, the reducer 86 comprises a first disengagement system 96 for the second planetary gear train 90', and a second disengagement system 96' for the third planetary gear train 90''.

Each disengagement system 96, 96' occupies a first, disengaged state, in which it does not modify the ratio of the associated planetary gear train, and a second, engaged state in which it modifies the ratio of the associated planetary gear train.

Each disengagement system 96, 96' comprises an actuator 98, 98' which can be manipulated by a user, thus making it possible to switch the disengagement system 96, 96' to the disengaged state or to the engaged state.

According to one embodiment, when the disengagement system 96 is in the disengaged state, the second planetary gear train has a ratio R', and when the disengagement system 96 is in the engaged state, the second planetary gear train 90' has a ratio equal to 1. In parallel, when the disengagement system 96' is in the disengaged state, the third planetary gear train 90'' has a ratio R'', and when the disengagement system 96' is in the engaged state, the third planetary gear train 90'' has a ratio equal to 1.

Thus, when the two disengagement systems 96, 96' are in the disengaged state, the reducer 86 has a total ratio equal to R×R'×R''. When the two disengagement systems 96, 96' are in the engaged state, the reducer 86 has a total ratio equal to R. When the first disengagement system 96 is in the engaged state, the reducer 86 has a total ratio equal to R×R''. When the second disengagement system 96' is in the engaged state, the reducer has a total ratio equal to R×R'.

The reducer 86, as well as the structure for adjustment of its ratio, are not limited to the embodiments previously described.

Advantageously, as illustrated in FIGS. 5A and 5B, the helical connection 70 comprises a disengagement mechanism 100 which occupies an engaged state, in which the movement of rotation of the drive shaft 66 is converted into movement of translation of the mobile part 20, or a disengaged state, in which the movement of rotation of the drive shaft 66 is free, and does not generate movement of translation of the mobile part 20.

For this purpose, the first end 72 of the drive shaft 66 comprises two projecting elements, each in the form of a ball 78, 78', which is mobile between a projecting position in the engaged state, in which the balls co-operate with the helical groove 76, and a retracted position in the disengaged state, in which the balls are spaced from, and do not co-operate with, the helical groove 76.

According to one embodiment, the first end 72 of the drive shaft 66 is in the form of a tube 102 with a lateral wall comprising two radial ducts 104, and an end wall 106 comprising an orifice 108.

Each radial duct 104 accommodates a ball 78, 78', and has a diameter which is slightly larger than that of the balls 78, 78'.

As a complement, the disengagement mechanism 100 comprises a piston 110 with a body 112 which slides in the interior of the tube 102, and a head 114 which is disposed on the exterior of the tube 102, and is connected to the body 112 by a connection cylinder 116. The body 112, the head 114 and the connection cylinder 116 are connected kinematically.

The piston 110 slides relative to the tube 102, between a first position in the engaged state, in which the body 112 is disposed at right angles to the radial ducts 104, and a second position in the disengaged state, in which the connection cylinder 116 is disposed at right-angles to the radial ducts 104.

A return 118, such as a compression spring for example, is disposed in the interior of the tube 102, and thrusts the body 112 against the end wall 106, such that the piston is in the engaged state.

From the dimensional point of view, the head 114 and the body 112 have a diameter larger than that of the orifice 108 in the tube 102, and the connection cylinder 116 has a diameter smaller than that of the orifice 108 in the tube 102.

To within the sliding play, the piston 110 has an outer diameter which is equal to the inner diameter of the tube 102. The connection cylinder 116 has an outer diameter which is equal to the outer diameter of the tube 102, less than twice the diameter of a ball 78, 78'.

The radial ducts 104 are disposed in the vicinity of the end wall 106. In parallel, the length of the connection cylinder 116 is designed such that, when the head 114 is in contact with the end wall 106, the radial ducts 104 open opposite the connection cylinder 116.

The disengagement mechanism 100 also comprises an end-of-travel stop 120. This stop 120 is disposed in the interior of the tube 74 of the planetary gear connection 70.

This stop 120 comprises a contact surface, against which there is supported a contact surface of the head 114, at the end of travel of the piston 110.

Preferably, the contact surface of the stop 120 comprises a buffer made of resilient material in order to dampen the contact. As a variant or as a complement, the contact surface of the head 114 comprises a buffer made of resilient material in order to dampen the contact.

In operation, before the drilling, as illustrated in FIG. 5A, the head 114 of the disengagement mechanism is spaced from the stop 120, and the body 112 retains the balls 78, 78' in the projecting position. During the drilling, the distance between the head 114 and the stop 120 is reduced. At the end of travel, as illustrated in FIG. 5B, the stop 120 comes into contact with the head 114, and gives rise to the translation of the piston 110 along the drive shaft 66, against return 118, until the connection cylinder 116 permits the displacement of the balls 78, 78' towards the interior of the drive shaft 66, to the retracted position, such as to give rise to transition to the disengaged state.

Advantageously, the position of the stop 120 according to the axis A66 is adjustable, such as to be able to adjust the course C66 of the drive shaft 66.

From the structural point of view, the fixed part 18 comprises two parallel tubes which are integral with one another, i.e. a first fixed tube 22 in which the tool 12 is positioned, and a second fixed tube 22' in which the reducer 86 and the drive shaft 66 are positioned. Similarly, the mobile part 20 comprises two parallel tubes which are integral with one another, i.e. a first mobile tube 26 in which the tool 12 is positioned, and a second mobile tube 26' in which the helical connection 70 is positioned. According to this arrangement, the first mobile tube 26 slides on the exterior of the first fixed tube 22, and the second mobile tube 26' slides on the exterior of the second fixed tube 22'.

Although they are of an imposing size in the figures, the size of the second fixed 22' and mobile 26' tubes can be reduced in order to reduce the dimensions.

The operating principle of the second variant is as follows:

Before the drilling, the user selects the ratio of the reducer 86.

During the drilling, the rotation of the chuck 14 gives rise to rotation of the toothed wheel 80 and of the input shaft 88 of the reducer. Thus, the rotation of the chuck 14 gives rise to the rotation of the drive shaft 66, at a speed which is proportional to the cutting speed of the tool 12, according to the ratio selected.

The rotation of the drive shaft 66 is converted by the helical connection 70 into movement of translation of the mobile part 20, at a given linear speed which depends on the speed of rotation of the drive shaft 66, and thus on the cutting speed.

With the distance between the mobile part 20 and the chuck 14 decreasing, the tool 12 is displaced relatively in relation to the mobile part 20, and penetrates into the material at the same speed as the linear speed of the mobile part 20 relative to the fixed part 18.

Thus, according to this variant, the speed of advance of the tool 12 is coupled with, and proportional to, its cutting speed.

Advantageously, irrespective of the variant, the device for control of advance 16 comprises at least one stop 122 in order to limit the course C20 of the mobile part 20 relative to the fixed part 18. According to one embodiment, the stop 122 is secured on the exterior of the fixed part 18, and interferes with the movement of the mobile part 20.

Preferably, the stop 122 is adjustable, and permits adjustment of the course C20. According to one embodiment, the stop 122 comprises a body 124 which is secured to the fixed part 18, and a head 126, the position of which relative to the body 124 is adjustable, so as to adjust the course C20.

Advantageously, irrespective of the embodiment variant, the device for control of advance 16 comprises an indicator for indication of the relative position of the mobile part 20 in relation to the fixed part 18. This arrangement makes it possible to indicate to the user the length of penetration of the tool into the material. According to one embodiment, these can be in the form of a marking 128 on the outer surface of the fixed part 18. According to another embodiment, these can be in the form of an electronic display which is coupled to a measuring apparatus such as a range finder.

Irrespective of the variant, the movement of advance and the speed of advance of the tool 12 are equal respectively to the movement of translation and the linear speed of the mobile part 20 relative to the fixed part 18, the mobile part having an end in contact with a part to be machined during the drilling. As a complement, the system for control of the movement of relative translation between the fixed 18 and mobile 20 parts comprises:

- a rotary element (either the toothed wheel 40 or 52 for the first variant, or the drive shaft 66 for the second variant);
- a converter for the movement of relative translation between the fixed 18 and mobile 20 parts into movement of rotation of the rotary element (either the assembly formed by the rack 34 and the toothed wheel or the pinion 40, 40' for the first variant, or the helical connection 70 for the second variant);
- a control for controlling the movement of rotation of the rotary element.

According to the first variant, the control for controlling the movement of rotation of the rotary element regulates the speed of rotation relative to at least one set value.

According to the second variant, the control for controlling the movement of rotation of the rotary element couples the rotary element to the chuck. Thus, the speed of rotation of the rotary element is proportional to the cutting speed.

In practice, it is simpler to control movement of rotation of a rotary element than movement of translation. According to another advantage, the subject matter disclosed herein ensures greater precision of control of the movement of advance, since control of advance is not dependent on control of the flow of a hydraulic fluid, as in the prior art.

The fact that the fixed 18 and mobile 20 parts are fixed 22 and mobile 26 tubes which are coaxial to the longitudinal axis A12 (and thus to the tool 12) makes it possible to reduce the hold on the part to be drilled, and to be able to use the device for control of advance even if the part to be drilled has a small flat surface area around the hole. Finally, since the fixed 18 and mobile 20 parts are aligned according to the axis of rotation, the forces between the part to be drilled, the parts 18 and 20 and the manual drilling apparatus are aligned according to the axis of rotation such that the risks of occurrence of moments which are liable to disrupt the operation of the device are low.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A manual drilling apparatus comprising a chuck which supports a tool with an axis of rotation and a device for control of advance of the tool, which comprises:
    a fixed part and a mobile part, the mobile part having an end in contact with a part to be drilled during drilling, and the mobile part having movement of translation relative to the fixed part during the drilling; and
    a system for control of the movement of translation of the mobile part relative to the fixed part,
    the fixed part and the mobile part comprising respectively at least one fixed tube and at least one mobile tube which slide relative to one another, the fixed and mobile tubes being coaxial to the axis of rotation of the tool, and the system for control of the movement of translation of the mobile part relative to the fixed part comprising:
    a rotary element;
    a converter of the movement of translation of the mobile part relative to the fixed part into movement of rotation of the rotary element; and
    a control for controlling movement of rotation of the rotary element.

2. The manual drilling apparatus according to claim 1, wherein the converter of the movement of translation of the mobile part relative to the fixed part into movement of rotation of the rotary element comprises a rack, which is connected to the fixed part and is parallel to the axis of rotation, and a toothed wheel or a pinion which engages with the rack, and is integral with a shaft which pivots in a bearing connected to the mobile part.

3. The manual drilling apparatus according to claim 1, wherein the control for controlling the movement of rotation of the rotary element comprises:
    a detector or measurement device for measuring the speed of rotation of the rotary element;
    a brake for braking the rotary element upon receipt of a control signal; and
    an automatic control configured for comparison of the speed of rotation measured with at least one set value, and for emitting a control signal if the speed of rotation measured is greater than the set value.

4. The manual drilling apparatus according claim 1, wherein the rotary element is a toothed wheel.

5. The manual drilling apparatus according to claim 3, wherein the detector or measurement device for measuring the speed of rotation of the rotary element is an incremental sensor.

6. The manual drilling apparatus according to claim 1, wherein the control for controlling the movement of rotation of the rotary element comprises a mechanism for coupling the rotary element with the chuck.

7. The manual drilling apparatus according to claim 6, wherein the coupling mechanism comprises a toothed wheel with a friction cone in the centre which is in contact with the chuck.

8. The manual drilling apparatus according to claim 6, wherein the coupling mechanism comprises a reducer.

9. The manual drilling apparatus according to claim 8, wherein the reducer is configured for adjusting the ratio between the input and output speeds of rotation of the reducer.

10. The manual drilling apparatus according to claim 6, wherein the converter of the movement of translation of the mobile part relative to the fixed part into movement of rotation of the rotary element comprises a helical connection comprising a tube with an axis which is parallel to the axis of rotation and is integral with the mobile part, with a wall which has at least one helical groove, the rotary element comprising at least one projecting element, the forms of which cooperate with those of the helical groove.

11. The manual drilling apparatus according to claim 10, wherein the helical connection comprises a disengagement mechanism.

12. The manual drilling apparatus according to claim 10, wherein the device for control of advance comprises at least one stop to limit the course of the mobile part relative to the fixed part.

13. The manual drilling apparatus according to claim 10, wherein the device for control of advance is configured for indicating the relative position of the mobile part in relation to the fixed part.

* * * * *